(12) United States Patent
Kim

(10) Patent No.: US 6,979,053 B2
(45) Date of Patent: Dec. 27, 2005

(54) REINFORCEMENT STRUCTURE FOR FRONT END MODULE CARRIER

(75) Inventor: Mycong-ki Kim, Yongin-shi (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 10/713,249

(22) Filed: Nov. 17, 2003

(65) Prior Publication Data

US 2005/0082140 A1    Apr. 21, 2005

(30) Foreign Application Priority Data

Oct. 17, 2003  (KR) ...................... 10-2003-0072659

(51) Int. Cl.⁷ .............................................. B60J 7/00
(52) U.S. Cl. ......................... 296/193.09; 296/203.02; 296/193.1
(58) Field of Search ...................... 296/187.01, 187.03, 296/187.09, 187.1, 193.01, 193.09, 193.1; 180/68.4

(56) References Cited

U.S. PATENT DOCUMENTS

| | | | | |
|---|---|---|---|---|
| 2,662,794 A | * | 12/1953 | Lindsay ................. | 296/193.01 |
| 3,086,606 A | * | 4/1963 | Schwiering et al. ... | 296/193.09 |
| 4,141,426 A | * | 2/1979 | Hamada et al. ........... | 180/68.4 |
| 4,194,763 A | * | 3/1980 | Reidelbach et al. ........ | 280/784 |
| 4,358,152 A | * | 11/1982 | Mayer et al. .......... | 296/187.09 |
| 4,428,447 A | | 1/1984 | Malen ....................... | 180/68.4 |
| 4,542,934 A | * | 9/1985 | Komatsu et al. ....... | 296/203.02 |
| 4,940,281 A | * | 7/1990 | Komatsu ............... | 296/193.09 |
| 5,048,345 A | * | 9/1991 | Hagiwara et al. ............. | 73/788 |
| 5,106,148 A | * | 4/1992 | Ikeda et al. ............ | 296/203.02 |
| 5,271,473 A | * | 12/1993 | Ikeda et al. ............ | 296/203.02 |
| 5,348,114 A | * | 9/1994 | Yamauchi ............... | 296/203.02 |
| 5,409,288 A | * | 4/1995 | Masuda ................. | 296/193.09 |
| 5,573,299 A | * | 11/1996 | Masuda ................. | 296/193.09 |
| 5,575,526 A | * | 11/1996 | Wycech ....................... | 296/205 |
| 5,597,198 A | * | 1/1997 | Takanishi et al. ....... | 296/193.09 |
| 5,865,500 A | * | 2/1999 | Sanada et al. .............. | 293/115 |
| 6,155,633 A | * | 12/2000 | Minami et al. ......... | 296/193.09 |
| 6,170,906 B1 | * | 1/2001 | Kasuga .................. | 296/203.02 |
| 6,293,617 B1 | * | 9/2001 | Sukegawa .............. | 296/203.03 |
| 6,338,510 B1 | * | 1/2002 | Kanamori et al. .......... | 293/154 |
| 6,357,821 B1 | * | 3/2002 | Maj et al. .............. | 296/193.09 |
| 6,364,403 B1 | * | 4/2002 | Ozawa et al. .......... | 296/187.09 |

(Continued)

FOREIGN PATENT DOCUMENTS

JP           10329753        12/1998

(Continued)

OTHER PUBLICATIONS

English Language Abstract of JP 10-329755.

(Continued)

*Primary Examiner*—Kiran B. Patel
(74) *Attorney, Agent, or Firm*—Greenblum & Bernstein, P.L.C.

(57) ABSTRACT

The reinforcement structure for a front-end module carrier is the reinforcement structure comprises an upper member installed with a hood latch, a vertical member connected to a middle portion of the upper member so as to support the upper member, and a lower member fixed to a lower portion of the vertical member, the lower member having a downwardly dented concave shape. According to the present invention, when an automobile is in motion, by virtue of the use of the lower member formed so as to have the downwardly dented concave shape, it is possible to easily distribute a vertical upward load generated when the hood latch is liable to be raised upward by wind resistance, resulting in the prevention of deformation of the lower member.

9 Claims, 3 Drawing Sheets

U.S. PATENT DOCUMENTS

| | | | |
|---|---|---|---|
| 6,382,709 B1 * | 5/2002 | Chirifu et al. | 296/193.1 |
| 6,386,624 B1 * | 5/2002 | Schultz et al. | 296/193.1 |
| 6,502,653 B1 * | 1/2003 | Balzer et al. | 296/203.02 |
| 6,508,506 B2 * | 1/2003 | Ozawa et al. | 296/203.02 |
| 6,533,347 B2 * | 3/2003 | Sanada | 296/193.06 |
| 6,547,317 B1 * | 4/2003 | Cheron et al. | 296/193.01 |
| 6,634,702 B1 * | 10/2003 | Pleschke et al. | 296/203.02 |
| 6,676,179 B2 * | 1/2004 | Sato et al. | 293/115 |
| 6,679,545 B1 * | 1/2004 | Balzer et al. | 296/193.09 |
| 6,708,790 B2 * | 3/2004 | Ozawa et al. | 180/68.4 |
| 6,729,424 B2 * | 5/2004 | Joutaki et al. | 296/203.02 |
| 6,789,606 B2 * | 9/2004 | Ohki | 165/41 |
| 6,923,495 B2 * | 8/2005 | Kishikawa et al. | 296/193.09 |
| 2002/0017806 A1 * | 2/2002 | Funakoshi et al. | 296/194 |
| 2004/0011577 A1 | 1/2004 | Jung | 180/68.4 |

FOREIGN PATENT DOCUMENTS

| | | |
|---|---|---|
| JP | 10329755 | 12/1998 |
| JP | 11-34920 | 2/1999 |

OTHER PUBLICATIONS

English Language Abstract of JP 11-34920.
English Language Abstract of JP 10-329753.

* cited by examiner

REINFORCEMENT STRUCTURE FOR FRONT END MODULE CARRIER

RELATED APPLICATION

The present disclosure relates to subject maw contained in Korean application No.2003-72659, filed on Oct. 17, 2003, which is herein expressly incorporated by reference its entirety.

BACKGROUND OF THE INVENTION

1. Field of the Invention

The present invention relates to a reinforcement structure for a front end module carrier, and more particularly to a reinforced front end module carrier comprising a lower member, which is configured to have a downward concave shape and adapted to reinforce the overall rigidity of the carrier against an upward force caused by a hood latch provided on the carrier 2. Description of the Related Art In general, body structures of automobiles are basically classified into monocoque body structure and frame structures, and again monocoque body structures are differentiated in accordance with their driving manners, such as FF (front engine front wheel drive) or FR (front engine rear wheel drive), and the automobile suspension type. Further, according to manufacturers, the monocoque body structures have slight differences in assembly order of its components, division manners thereof and the like.

Explaining the generic structure of a monocoque body, it is basically divided into a front body, a center body, and a rear body. Certain exterior components of the monocoque body, for example, a front fender, hood, front balance panel, and the like included in the front body thereof are fastened with bolts, and most other structural members constituting the framework of the monocoque body are welded to its main body by spot welding. Such a monocoque body is a frameless body.

Nowadays, most automobiles have adopted the monocoque body due to its various advantages. That is, since the monocoque body is integrally formed with a chassis frame, it is lighter, and capable of effectively absorbing shock generated in an automobile crash, and of uniformly absorbing an external force with the entire body.

As shown in FIG. 1, the monocoque body, designated as reference numeral 1, comprises a front body 3, a center body 5, and a rear body 7, which are successively arranged in a longitudinal direction of an automobile.

The front body 3 comprises an inner panel portion including a dash panel, a wheelhouse and front fender, and an outer panel portion having a hood and front leading panel. In the case of the center body 5, since it is essentially free from external forces except for the rear portion of its floor where a driving device is installed, it can be formed to have a box shape by processing a thin panel with a press. The center body 5 comprises a floor panel, both side panels, a roof panel 8, a cowl panel 9, doom and the like. The rear body 7 includes a rear floor panel, rear fender, lower back panel, and the like.

The monocoque-body further comprises lower body frames, which are arranged on the left and right sides of the lower side thereof while being spaced apart from each other. These lower body frames build up a basic framework at the lower side of the body for supporting the entire body. The lower body frames are adapted to initially receive a shock generated in an automobile crash, thereby dispersing it across the entire body of an automobile.

At the front side of the front body 3 is mounted a carrier 10 which is obtained by applying a front-end module (FEM) technique. Such a, front end module carrier is used to assemble left and right head lamps, a radiator, a condenser, a bumper, and the like within a body panel, thereby improving the ease with which the above components are assembled, shortening assembly time by reducing the number of components to be assembled, and ensuring greater assembly.

Referring to FIG. 2 illustrating the conventional front end module carrier 10, it comprises head lamp mounting portions 11 formed at both sides of the upper portion thereof a cooling module mourning portion 12 in front of which a cooling module including a radiator and a condenser is mounted a vertical member 14 extending downward from the middle portion of an upper member 13 provided at the upper side of the cooling module mounting portion 12 and used for the installation of an automobile's horn and the like, and a lower member 15 formed at the lower side of the cooling module mounting portion 12 and used for the installation of a bumper, fog lamps and the like.

Referring to FIG. 3, the upper member 13 is installed with a hood latch 17 at the middle portion thereof connected to the vertical member 14. The hood latch 17 serves as a locking device for a hood covering the front top portion of an automobile.

When the automobile is in motion the hood moves upward due to wind resistance, hence a vertical upward load is applied to the hood latch.

As shown in FIG. 3, the vertical upward load applied to the hood latch 17, which is installed at the upper member 13, is transmitted to the upper member 13, and hence to the vertical member 14 connected to the upper member 13. In turn, the load is transmitted to the lower member 15, and consequently, to side members 19 located at both sides of the lower member 15.

The lower member 15 is configured to have a relatively long length and a constant height across the overall length. With this structure, when the vertical upward load applied to the hood latch 17 is transmitted to the lower member 15 through the vertical member 14, the lower member 15 cannot support the transmitted load, resulting in its distortion.

Further, since the lower member 15 comes into contact with the side members 19 over a relatively small contact area, the load transmitted to the lower member 15 cannot be easily transmitted to the side members 19, thereby causing the load to be concentrated only to the lower member 15.

Furthermore, the lower member 15, as shown in FIG. 2, is linearly formed at the center portion thereof. In this case, if an external shock is applied to the front side of the carrier 10, the carrier 10 cannot absorb the shock, thereby causing the shock to be directly applied to the internal components thereof.

For the above reasons, the carrier 10 is easily deformed even by a relatively light external shock due to its poor durability, thereby damaging its internal components.

SUMMARY OF THE INVENTION

Therefore, the present invention has been made in view of the above problems, and it is an object of the present invention to provide the reinforcement structure for a front end module carrier comprising a lower member, which has high durability against a vertical upward load caused by a hood latch.

It is another object of the present invention to provide the reinforcement structure for a front end module carrier, which is configured to allow an external force transmitted to its lower member to be easily transmitted to side members located at both sides of the lower member.

It is yet another object of the present invention to provide the reinforcement structure for a front-end module carrier having a high durability against a shock applied to the front side thereof.

In accordance with the present invention, the above and other objects can be accomplished by the provision of reinforcement structure for a front end module carrier comprising: an upper member having a hood latch, a vertical member connected to a middle portion of the upper member so as to support the upper member; and a lower member fixed to a lower portion of the vertical member, the lower member having a downward dented concave shape.

Preferably, the lower member may be curved toward its front side.

According to the present invention, when an automobile is in motion, it is possible to allow a certain vertical upward load applied to a front end module carrier, the vertical upward load being generated by a force liable to lift a hood latch installed at the front end module carrier due to wind resistance to be easily dispersed, by virtue of a lower member consisting the front end module carrier, the lower member having a downwardly dented concave upper shape so as to prevent it from being deformed by the load.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
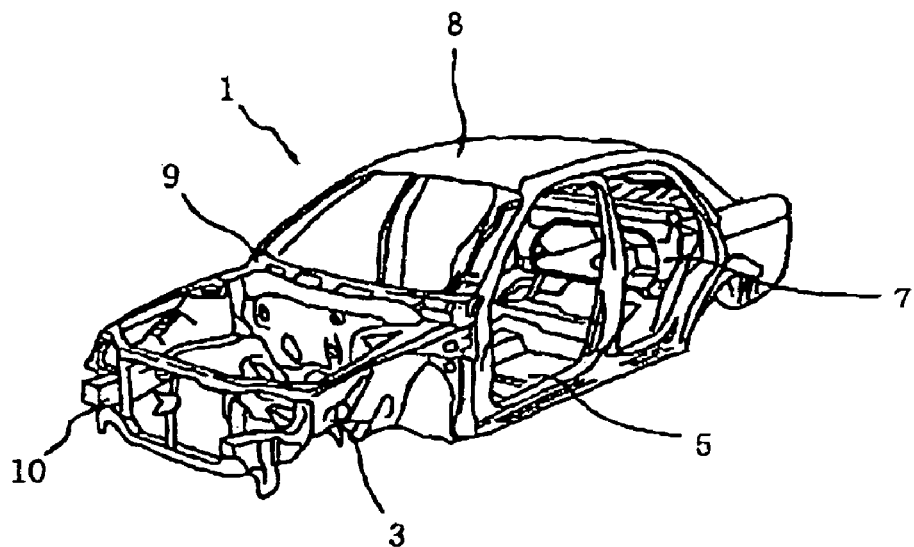
FIG. 1 is a perspective view illustrating a monocoque body of a general automobile.
Figure 2:
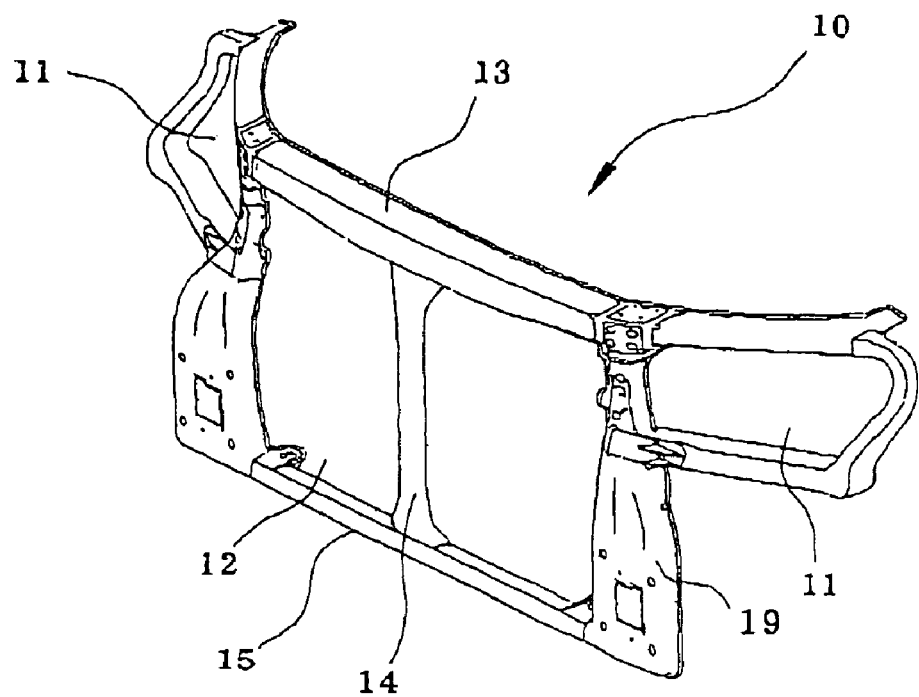
FIG. 2 is a perspective view illustrating a conventional front-end module carrier, which is mounted at the front portion of the monocoque body shown in FIG. 1.
Figure 3:
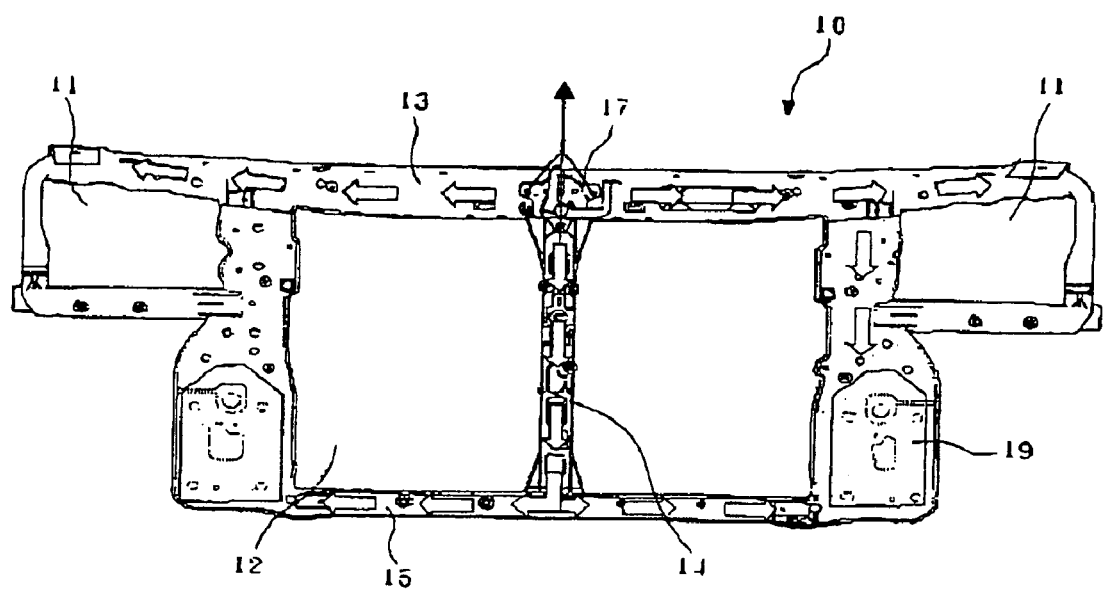
FIG. 3 is a front view of FIG. 2.
Figure 4:
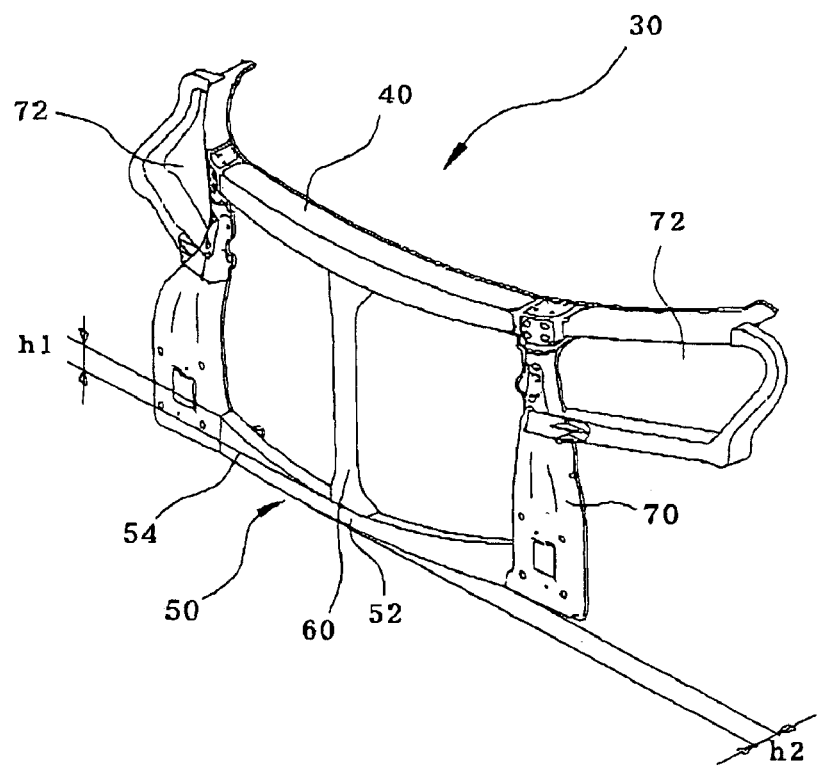
FIG. 4 is a perspective view illustrating the reinforcement structure for a font end module carrier in accordance with an embodiment of the present invention.
Figure 5:
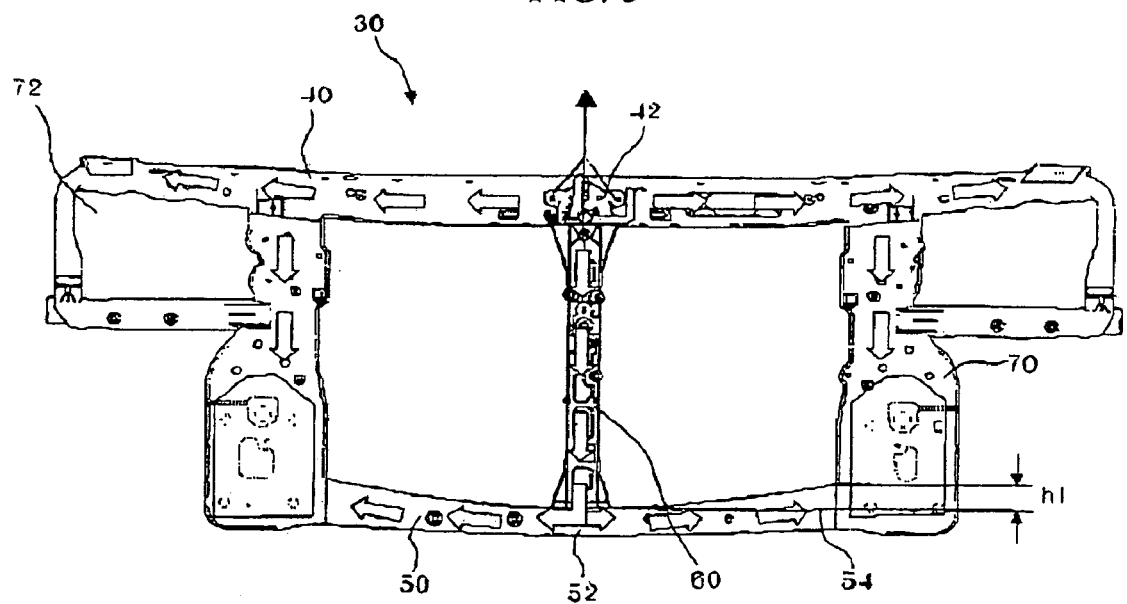
FIG. 5 is a front view of FIG. 4.

Referring to FIGS. 4 and 5, there is shown the reinforcement structure of a front-end module carrier, designated as reference numeral 30. The front end module carrier 30 comprises an upper member 40 for supporting the upper side of the carrier 30, a lower member 50 for supporting the lower side of the carrier 30, and a vertical member 60 and a pair of side members 70, which are installed between the upper and lower members 40 and 50.

The side members 70 are formed with mounting portions 72 for the installation of headlamps.

Considering the shape of the lower member in detail, first, as can be seen well from FIG. 5 shown as a front view, the lower member 50 is downwardly dented so as to form a concave shape. Further, as shown in FIG. 4, the lower member 50 is formed so as to have a protruding convex shape of a constant curvature.

The lower member 50 comprises a centered fixing portion 52 connected to the vertical member 60, and both side-fixing portions 54 connected to the side members 70.

With the above configuration of the lower member 50, as shown in FIG. 5 illustrating the front side of the front-end module carrier 30, the lower member 50 is gradually dented from the side fixing portions 54 toward the center fixing portion 52. That is, the center fixing portion 52 forms the lowest portion of the concave lower member 50, and the side fixing portions 54 having a certain height compared with the center fixing portion 50.

Therefore, from a vertical distance h1, which is obtained by measuring the distance between the upper surface of the lowest center fixing portion 52 and the upper surfaces of the side fixing portions 54, it is possible to calculate the degree of concavity of the lower member 50.

Further, when the lower member 50 is viewed in a horizontal direction thereof, since the lower member 50 has the convex bent shape, which protrudes forward from the side fixing portions 54 toward the center fixing portion 52, a horizontal distance h2 between the side fixing portions 54 and the center fixing portion 52 indicates the degree of convexity of the lower member 50, namely, the curvature thereof.

Meanwhile, as shown in FIG. 5, the upper member 40 is installed with a hood latch 42 at a portion where the upper member 40 is connected to the vertical member 60. The hood latch 42 serves as a locking device for a hood.

The operation of the reinforcement structure for the front-end module carrier in accordance with the present invention will be explained with reference to the accompanying drawings.

Due to wind resistance, which is usually applied to a hood of an automobile when it is in motion, the hood latch 42 is subjected to a vertical upward load. If the hood is damaged in the case of an automobile crash, such a vertical upward load is directly applied to the corresponding portion of the upper member 40 of the front end module carrier 30.

The vertical upward load applied to the upper member 40 is transferred to the lower member 50 through the vertical member 60.

In case of the load transmitted to the lower member 50 through the vertical member 60, however, by virtue of the downwardly dented concave shape, which is given by the vertical distance h1, the lower member 50 has an improved rigidity against the vertical load transmitted thereto, compared with conventional carriers, thereby constituting the reinforcement structure for the front end module carrier 30.

With the downwardly dented concave shape, the lower member 50, especially its side fixing portions 54 can come into contact with the side members 70 across a relatively wide area.

This enables the load transmitted to the lower member 50 to be easily transmitted to the side members 70.

Further, since the lower member 50 is bent to protrude forward at a constant curvature, which is given by the horizontal distance h2, the lower member 50 can function to absorb the predetermined amount of shock even when the shock is directly applied to the front side of the carrier 30, thereby preventing transmission of the shock to its internal components.

As apparent from the above description, the present invention provides a reinforcement structure for a front end module carrier comprising a lower member, which is formed to have a downwardly dented concave shape or achieving high durability against a vertical upward load caused by a hood latch, and which comes into contact with side members provided at both sides thereof at a contact area gear than that of conventional carriers for allowing the vertical upward load applied to the lower member to be easily transmitted to the side members, thereby preventing deformation or distortion of the lower member itself and consequently improving its durability.

Further, according to the present invention, as the lower member is bent forward to have a certain curvature, it can have a high rigidity against a shock applied to the front side thereof thereby having improved durability and stability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reinforcement structure for a front-end module carrier comprising:
    an upper member having a hood latch;
    a vertical member connected to a middle portion of the upper member so as to support the upper member;
    a lower member fixed to a lower portion of the vertical member, the lower member having a downwardly curved shape and extending forward from the reinforcement structure; and
    side members, wherein the lower member comprises side fixing portions which contact said side members, and a height of the lower member at said side fixing portions is substantially greater than a height of the lower member at the location that the lower member is fixed to the lower part of the vertical member.

2. The reinforcement structure as set forth in claim 1, wherein the lower member has a constant curvature toward a front side.

3. The reinforcement structure as set forth in claim 1, wherein the lower member bends forwardly so as to absorb shock applied to the front side of the front-end module carrier, to thereby prevent transmission of the shock to internal components of the carrier.

4. The reinforcement structure according to claim 1, wherein the narrowest portion of the lower member includes a region to which the vertical member is fixed, the narrowest portion comprising part of the downwardly curved shape.

5. The reinforcement structure according to claim 1, wherein the lower member comprises a narrowest portion that is positioned at a central region of the lower member.

6. The reinforcement structure according to claim 1, wherein the lower member comprises a narrowest portion that is positioned more forwardly than the side members.

7. The reinforcement structure according to claim 1, wherein the upper member has a curved shape so as to extend forwardly at a central portion of the upper member.

8. The reinforcement structure according to claim 1, wherein the vertical member is fixed to a middle portion of the lower member.

9. The reinforcement structure according to claim 1, wherein the lower member comprises a substantially continuous curve.

* * * * *

UNITED STATES PATENT AND TRADEMARK OFFICE
CERTIFICATE OF CORRECTION

| | | |
|---|---|---|
| PATENT NO. | : 6,979,053 B2 | Page 1 of 1 |
| APPLICATION NO. | : 10/713249 | |
| DATED | : December 27, 2005 | |
| INVENTOR(S) | : Myeong-ki Kim | |

It is certified that error appears in the above-identified patent and that said Letters Patent is hereby corrected as shown below:

On Title Page, col. 1 Item (75), Inventor, "Mycong-ki" should be --Myeong-ki--.

Signed and Sealed this

Twelfth Day of September, 2006

JON W. DUDAS
*Director of the United States Patent and Trademark Office*